Oct. 7, 1969 — S. URBAN — 3,471,762
CONSTANT SPEED MOTOR INCLUDING A MECHANICAL OSCILLATORY SYSTEM MOUNTED UPON THE ROTOR
Filed June 6, 1967

Inventor:
Siegfried Urban
BY Spencer & Kaye
Attorneys

Oct. 7, 1969

S. URBAN 3,471,762

CONSTANT SPEED MOTOR INCLUDING A MECHANICAL OSCILLATORY
SYSTEM MOUNTED UPON THE ROTOR

Filed June 6, 1967

Inventor:
Siegfried Urban
BY Spencer & Kaye
Attorneys

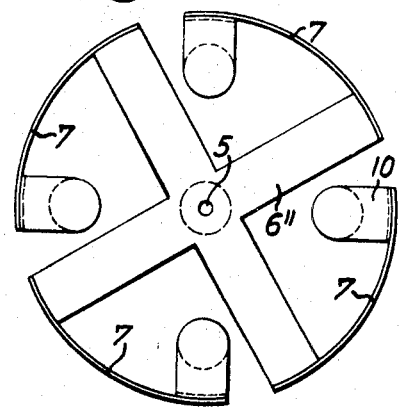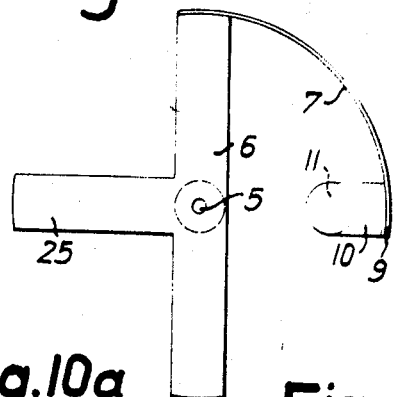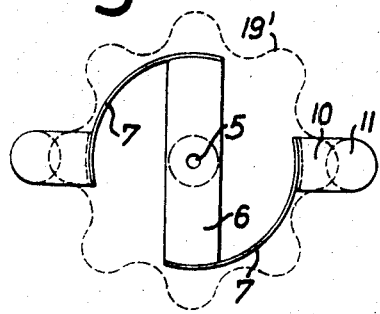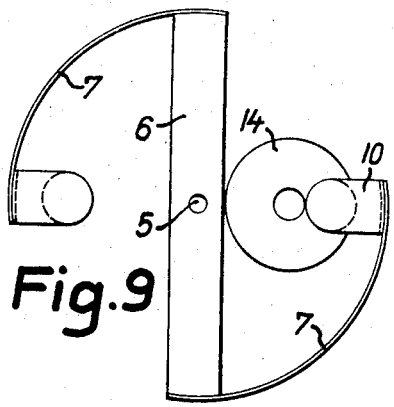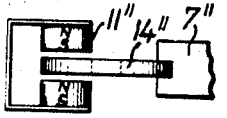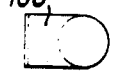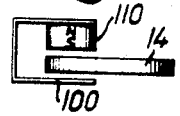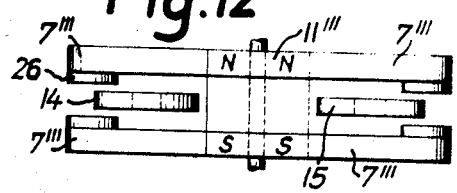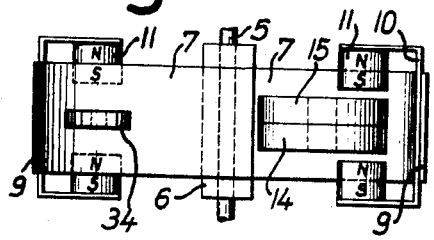

United States Patent Office 3,471,762
Patented Oct. 7, 1969

3,471,762
CONSTANT SPEED MOTOR INCLUDING A MECHANICAL OSCILLATORY SYSTEM MOUNTED UPON THE ROTOR
Siegfried Urban, Unterer Metzgerbach Near 9, 73 Esslingen (Neckar), Germany
Filed June 6, 1967, Ser. No. 643,975
Claims priority, application Germany, June 10, 1966, U 12,781
Int. Cl. H02k 27/20, 29/04
U.S. Cl. 318—138                    22 Claims

ABSTRACT OF THE DISCLOSURE

An electric motor whose rate of rotation is maintained constant by a mechanical oscillatory system mounted on its rotor and having a drive arrangement composed of a drive winding and control winding system and a magnetic system, one of these systems being mounted on the rotor and the other system being stationary and being arranged for permitting the magnetic field of the magnetic system to traverse the control winding so as to induce a voltage pulse which causes an excitation pulse to be produced by the excitation winding.

BACKGROUND OF THE INVENTION

The present invention relates to an electric motor, particularly for driving time-keeping devices.

The invention is particularly concerned with a motor whose rotor is coupled to a mechanical oscillating system which in order to control the rotor speed, cooperates with a triggerable electrical drive system arranged to be triggered in synchronism with the mechanical oscillations of the oscillating system for generating the drive pulses for the rotor.

A drive means of this type for electrical clocks is disclosed, for example, in German Patent No. 1,206,366. In this device, the rotor of a continuously rotating electromotor is connected to a retard mechanism via a pulley and a buffer spring, the rotor of this motor inducing voltage pulses in a control coil when it is rotating. These voltage pulses are applied, after suitable amplification, to a drive coil which furnishes excitation field pulses to drive the rotor. A principal disadvantage of this device consists in that it requires its own oscillating retard mechanism, which acts as a speed regulator and which effects the speed regulation of the drive motor, in order to permit such a motor to be utilized for driving a time-keeping device. The manufacturing costs of such a speed regulator are relatively large.

Such a motor is further encumbered with the disadvantages generally associated with an oscillating balance wheel such as the adverse effect of bearing friction and gumming of the oil which prevents precision operation, to mention only a few.

Furthermore, kinetic energy is normally drawn from the oscillating portion of the retard mechanism during the regulation of the electrical drive system, which loss of kinetic energy slows down the oscillation of the oscillating portion, and thus represents an undesirable factor with regard to precision operation. This creates a need for complicated devices, one such device being, for example, in the form of a scanning device which scans the oscillating portion with the aid of a radiation source, as is described, for example, in German Patent No. 1,210,384.

In addition to mechanical oscillators which are controlled without external adjustment connections and which serve as speed regulators for a time-keeping device—for example, as described in German Patents Nos. 1,166,101 and 1,105,804—and wherein the power for maintaining continuous movement of the hands of the device is supplied by a separate incorporated power source, such as an auxiliary clock motor for example. It is also known to provide an electric motor with a mechanical oscillating system to regulate its speed.

Such a motor, disclosed in German Patent No. 1,149,447, is composed of a continuously rotating rotor having a plurality of pole pairs and connected to a mechanically coupled additional rotor. The arrangement is such that the two rotor portions, together with a connection shaft, form a rotary oscillating system whose resonant frequency substantially determines the speed of rotation of the rotor. The additional rotor is arranged to induce voltages in a control coil, which voltages feed, via an amplifier, an exciter coil mechanically coupled to the control coil.

In this motor, the permanent magnet type rotors at the two ends of the shaft, which constitutes a torsion bar, provide the moment of inertia of the system whereas the torsion bar itself furnishes the resiliency for the rotary oscillating system. One principal disadvantage of this motor resides in the fact that its relatively complicated construction particularly makes the adjustment of the resonant frequency of the rotary oscillating system very difficult to effectuate under actual operating conditions. It is further not easy to accommodate this arrangement in the limited space available in, for example, a wrist watch.

SUMMARY OF THE INVENTION

It is therefore a primary object of the present invention to overcome the above-noted drawbacks and difficulties.

Another object of the present invention is to provide a structurally simple electric motor having a constant rate of rotation.

A further object is to provide a motor of this type which is extremely easy to adjust.

Yet another object of the present invention is to provide a motor of this type having an extremely small size.

Yet a further object of the present invention is to provide a motor of this type which is substantially insensitive to external influences, such as extraneous magnetic fields or changes in its orientation.

A still further object of the present invention is to provide a motor of this type which can be connected to directly drive the hands of a watch or clock.

The and other objects according to the present invention are achieved by the provision of a novel oscillatory system in an electric motor having a constant rotation rate and including a rotor whose speed is regulated by the mechanical oscillatory system, which is coupled to the rotor, and by a triggerable electrical drive system associated with the oscillatory system so as to be triggered in synchronism with the oscillatory system oscillations for producing excitation pulses for driving the rotor. The oscillatory system according to the present invention is essentially composed of at least one resilient oscillatory arm mounted on the rotor so as to have one free end which is arranged to oscillate and to be periodically influenced by the drive system excitation pulses when the rotor is rotating.

BRIEF DESCRIPTION OF THE DRAWINGS

FIGURE 4 is a plan view of the rotor of the motor of

FIGURE 3 with associated control and drive coils.

FIGURE 6 is a plan view of a modified rotor for motors according to the present invention.

FIGURE 7 is a plan view of another modified rotor.

FIGURE 8 is a plan view of yet another modified rotor.

FIGURE 9 is a plan view of a further modified rotor.

FIGURE 10a is a detail plan view of a modified element of a motor according to the present invention.

FIGURE 10b is an elevational view of the arrangement of FIGURE 10a.

FIGURE 11a is a view similar to that of FIGURE 10a of another modification of the element.

FIGURE 11b is an elevational view of the element of FIGURE 11a.

FIGURE 12 is an elevational view of a portion of another embodiment of the present invention.

FIGURE 13 is an elevational view of a motor employing the rotor of FIGURE 9.

DESCRIPTION OF THE PREFERRED EMBODIMENTS

Figure 1:
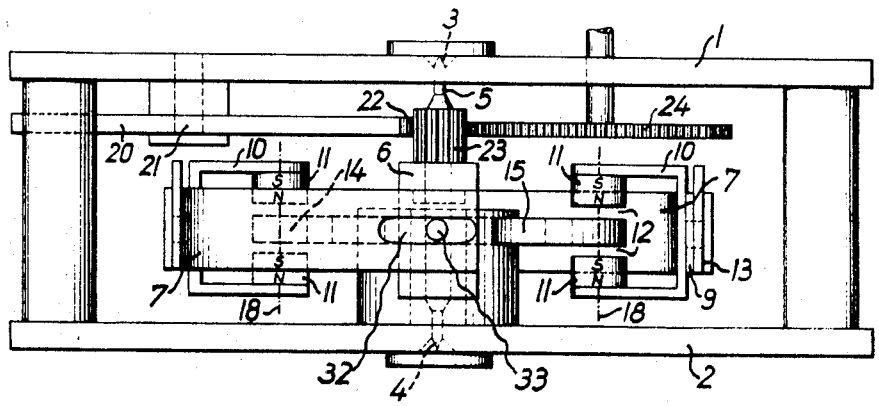
FIGURE 1 is an elevational view of an electric motor constituting one embodiment of the present invention.
Figure 2:
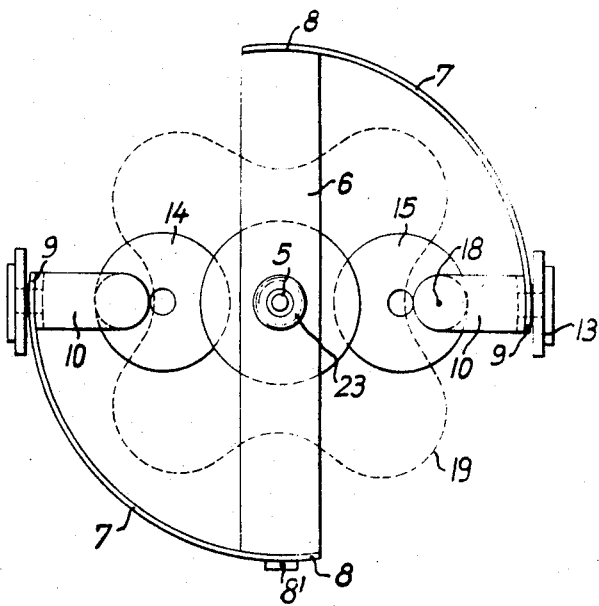
FIGURE 2 is a plan view of the rotor of the motor of FIGURE 1 with associated control and drive coils.

The motor shown in FIGURES 1 and 2 is comoosed of a rotor shaft 5 mounted at pivot points 3 and 4 between two support plates 1 and 2. The shaft carries a rotor 6 at whose ends two swing arms, or oscillating arms, 7 are fastened. The swing arms 7 consist of thin, arcuate, resilient steel bands which are coupled to the rotor 6 at the points 8, the connection being adjustable if required. For this purpose, each arm 7 is provided with a slot 32 through which passes a bolt 8' held in a threaded bore 33 in rotor 6 and rigidly connecting arm 7 to rotor 6. The slot 32 thus permits the point at which arm 7 is attached to rotor 6 to be varied. The arms 7 are provided near their free vibratory ends 9 with U-shaped soft-iron bars 10 whose branches bear permanent magnets 11 having poles which are oriented as indicated in FIGURE 1, each pair of magnets defining an air gap 12 between them. Each pair of magnets 11 defines a magnetic system having a central axis 18. Also near the ends 9 of the swing arms 7, regulating masses 13 are fastened which permit a variation in the resonant frequency of the oscillation of the swing arms 7.

Mounted on a stationary support carried by plate 2 are two coils, or windings, 14 and 15, each constructed as a flat air-core coil. Coils 14 and 15 are positioned to extend in a plane passing through the air gaps 12 between the magnets 11. With this arrangement, the air gaps will intersect coils 14 and 15 when the rotor 6 rotates. These coils, which could also be provided with a magnetic core, are interconnected in an electrical drive system to serve as the control and drive coil, respectively, in the manner illustrated in FIGURE 5. The circuit of FIGURE 5 has the form of a trigger circuit whose switching element is constituted by a transistor 16. However, the transistor could be replaced by a relay, a diode switch or any other corresponding switching element known per se. The current supply comes from a D.C. current source 17 and a capacitor C is provided to control the operation of the circuit.

Figure 5:
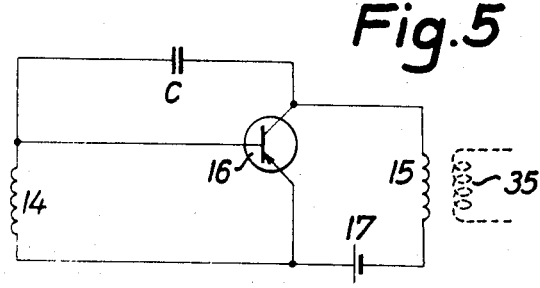
FIGURE 5 is a schematic illustration of an electrical drive system for the motors of FIGURES 1 and 3.

The mode of operation of the motor shown in FIGURES 1 and 2, and having a coil circuit of the type shown in FIGURE 5, is as follows:

When the rotor 6 is rotating, one magnetic system 11 traverses the control coil 14 causing a control pulse to be induced in the control coil 14. This pulse renders the transistor 16 conductive for a short period of time, permitting a current pulse to flow from the current source 17 through the diametrically disposed drive coil 15, this current resulting in a drive pulse in the form of a magnetic field. Because of the presence of this drive pulse, the other magnetic system 11, which is disposed in the vicinity of the drive coil 15, i.e., in the range of the magnetic field generated by the current pulse in drive coil 15, is attracted toward the axis of coil 15, causing the rotor 6 to be accelerated. Since coils 14 and 15 are disposed radially inwardly with respect to the quiescent positions of the vertical axes 18 of the magnetic systems 11, the magnetic system 11 adjacent coil 15 is also pulled radially inwardly by the drive coil 15 during the effective period of each drive pulse.

As the one magnetic system 11 passes coil 14, the control pulse induced therein ceases, thus cutting transistor 16 off and terminating the drive pulse produced by coil 15. As a result, the other magnetic system 11 previously pulled inwardly by coil 15 and fastened on the free vibratory end of one swing arm 7 swings resiliently outwardly.

Thus a constant oscillation of the two swing arms 7 in the vicinity of their free ends 9 is initiated, the frequency of which is determined by the resonant frequency of the mechanical oscillating system formed by the swing arms 7 and the masses which they carry, and in which the axes 18 of the magnetic systems 11 follow the path shown by the broken line 19.

Once the rotor 6 has been accelerated to a speed corresponding to a predetermined integral submultiple of this resonant frequency, e.g., one-fourth, and the oscillations have been started in the swing arms 7, the rotor 6 will maintain this rate of rotation independently and with great precision since it is fixed by the oscillatory behavior of the swing arms 7 whose ends follow the curve indicated at 19.

A stress placed on the rotor shaft 5 by an increased torque will, of course not change the frequency of oscillations of the swing arms 7. The only effect will be a rotation of the motion curve 19 with respect to coils 14 and 15. If the torque applied to shaft 5 exceeds a permissible maximum value, the rotor will run out of synchronism and come to a stop.

When the mechanical load on the rotor is reduced or completely removed, the motion curve 19 will rotate in the direction of rotor rotation to an angular position with reference to coils 14 and 15 in which the drive pulses are only effective to compensate for the reduced torque, or, in the case of no rotor load, to compensate for the friction torque. In the theoretical limit case of zero torque, the motion curve 19 will assume an angular position in which the ends of the swing arms 7 oscillate so as to maintain magnets 11 outside of the effective range of coils 14 and 15.

Since the rate of revolution of the rotor is determined by the resonant frequency of the oscillating system formed by the swing arms 7 and the masses which they carry, an extremely constant speed results which is independent, in a large measure, of the voltage of current source 17 and of the torque on rotor shaft 5.

Basically, it is also possible for the swing arms 7 to oscillate at a harmonic of their basic frequency, as is indicated, for example, in FIGURE 8.

Since the motor is not self-starting, a starting mechanism can be provided, which can be electrical or mechanical, or it is possible to make the motor self-starting by an appropriate construction of the electrical drive system. In the embodiment of FIGURE 1, a crank lever 20 is provided which is pivotably mounted at 21 and which can set the rotor shaft 5 in motion by means of a toothed end 22 engaging into a pinion 23 on the rotor. A further pivotally mounted cog wheel, or gear, 24 is coupled to the pinion 23 and can serve, for example, to drive the clock hands.

Motors according to the present invention are structurally quite simple since the resilient swing arms disposed on the rotor are rigidly connected to the rotor and do not require any additional bearing parts. Because of the special arrangement of swing arms on the rotor, an optimum adjustment to the required operating conditions can be achieved in each individual case. A very simple regulating means is thus provided, since the effective length and point of attachment of the swing arms can be varied very easily, as can the weight of the mass attached to the free ends of the arms.

The electrical drive system of the rotor of the motor can be of a known type. One such system, similar to that shown in FIGURE 5, is described, for example, in German Patent No. 1,149,447 and is composed of a control coil and a drive coil which are coupled to each other, via a triggerable switch element, generally a transistor. The drive coil generates excitation pulses which act on the free vibratory end of each resilient swing arm disposed on the rotor as it passes near the coil, while the control pulses are induced in the control coil by an element mounted on the end of each swing arm as it passes near the control coil.

The association of control and drive, or exciter, coils, as well as of the swing arms of the rotor with respect to each other, can be varied in many ways. Thus it is possible to have the free end of each swing arm carry at least one magnet which cooperates with the immovably disposed control and drive coils, as shown in FIGURES 1 and 2. It is also possible to mount the control and drive coils on the free ends of respective swing arms and to arrange them to cooperate with a stationary magnetic system. In this case, the electrical control system can also be disposed on the rotor, together with an electrical current source, which will generally be in the form of a battery.

In some cases it is also possible to have a magnet disposed directly on the rotor so that the lines of magnetic force emanate from the free ends of the swing arms, if necessary via pole pieces which cooperate with the stationary control and drive coils.

According to another advantageous form of construction, the swing arms can be mounted on the circumference of the rotor and can be arranged to oscillate in a plane perpendicular to the rotor axis. They can be made, for example, of thin resilient steel bands, as mentioned above. The number of swing arms to be fastened on the rotor depends on the particular operational requirements of the motor. In theory, one arm can be provided, but it will generally be advisable to provide at least two swing arms distributed symmetrically about the circumference of the rotor. Similar considerations apply for the number of control and drive coils.

In another embodiment of the present invention, the swing, or oscillatory, arms can be disposed on the rotor in such a manner that they can oscillate in a plane substantially parallel to the rotor axis. Here, also, the number of swing arms can be varied correspondingly.

Accordingly to another feature of the present invention, motors according to the invention can be utilized as pulse or frequency generators for controlling the speed of a higher-powered motor of a known type in order to give such motor an extremely constant rate of rotation. As mentioned above, the motor according to the present invention is particularly well suited, by its nature, for driving clock mechanisms. However, it can also be used for all other types of drive situations where an extremely constant rotating speed is required.

The modifications and applications mentioned above will be described in greater detail below.

Figure 3:
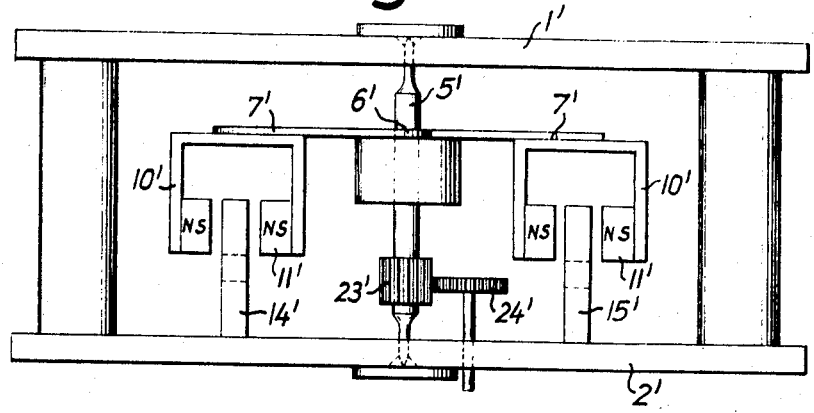
FIGURE 3 is an elevational view of another embodiment of a motor aicording to the present invention.
Figure 4:
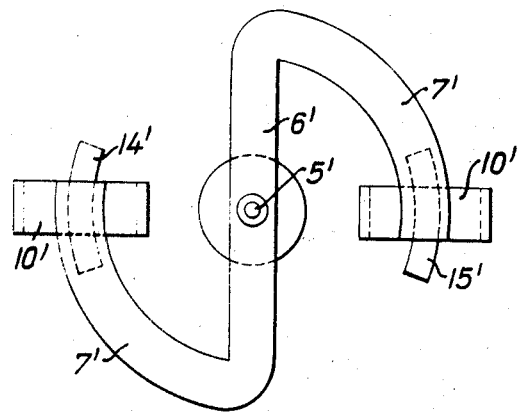

Whereas in the embodiment of FIGURES 1 and 2 the swing arms 7 are vibratory substantially in a plane perpendicular to the rotor shaft 5, in the embodiment shown in FIGURES 3 and 4 the motor is constructed so that the plane of oscillation of the free ends of the swing arms is substantially parallel to the rotor shaft 5.

As can be seen in FIGURES 3 and 4, in which parts corresponding to those of FIGURES 1 and 2 have corresponding primed numerals, the swing arms 7', which can also be made of flat resilient steel bands, are fastened on the rotor 6' in such a manner that they can experience up and down oscillations, taken with respect to the view of FIGURE 3. The control and drive coils 14' and 15' are constructed as upright, arcuate, air-core coils, which are also connected as shown in FIGURE 5. When bands 7' are in their rest position, as shown in FIGURE 3, the axes of the air gaps of magnetic systems 11' are above the axes of coils 14' and 15'. The mode of operation of this embodiment is substantially the same as that of FIGURES 1 and 2.

While FIGURES 2 and 4 each show rotors provided with two swing arms 7 or 7', respectively it is also possible to manufacture rotors provided with a different number of swing arms. Thus, FIGURE 6 shows an embodiment of a rotor essentially corresponding to the rotor of FIGURE 2 which possesses only one swing arm 7. To balance the rotor assembly, an extension 25 serving as a counterweight for the arm 7, bar 10 and magnets 11 is provided on the rotor 6.

The control coil and the drive coil are arranged as it is indicated in FIGURE 13.

In the embodiment of FIGURE 7, which is also provided with a swing arm arrangement capable of oscillating in a plane perpendicular to the rotor shaft 5, four swing arms 7 are provided on the circumference of a rotor 6" and are distributed around the rotor at regular intervals.

In the rotor FIGURE 2, the arrangement is such that coils 14 and 15 are disposed radially inwardly of the ends 9 of the swing arms 7. The bars 10, however, can equally well be disposed at the ends 9 of the swing arms so as to extend outwardly therefrom, as shown in FIGURE 8, and the coils 14 and 15 can be disposed radially outwardly of the swing arm ends.

The control and drive coils 14 and 15 in the embodiments of FIGURES 1–4 are disposed diametrically opposite one another. It would also be possible, however, to dispose the two coils at the same location and to combine them into a structural unit, as is shown in FIGURES 9 and 13, the latter being an elevational view of a motor incorporating the rotor of FIGURE 9.

Embodiments of the present invention could also be constructed so that, as is indicated in FIGURES 10a and 10b, the magnetic system or systems, 11" and bars 10" are stationary and the coils, of which only the coil 14" fastened on swing arm 7" is shown, rotate. It is also possible, as shown in FIGURES 11a and 11b, for each magnetic system to be provided with only one magnet 110 associated with a soft iron bar 100 which completes the magnetic circuit. In this case also, the magnetic system can be mounted to rotate or to be stationary.

FIGURE 12 finally shows an embodiment in which a magnetic system 11''' is provided on the rotor 6. The lines of magnetic force here emanate from the pole pieces 26 fastened on the ends of swing arms 7'''. The mode of operation is substantially the same as if the magnetic systems were disposed at the ends of the swing arms.

The embodiments illustrated in FIGURES 6–13 can be subjected to a wide variety of modifications without departing from the spirit of the present invention. They can particularly be modified, of course, to have varying forms of rotor construction.

It has been found to be particularly advantageous to use the motor according to the present invention to drive tape recorders and the like, either as a direct drive motor or as a pulse generator for controlling a larger motor.

When the motor is used as a pulse or frequency transmitter or as an independent frequency generator, the arrangement can be made so that at least one additional coil, such as coil 34 of FIGURE 13, is disposed in the region of influence of the rotor so that the passing magnetic systems 11 of the swing arms 7 will induce pulses therein which, after suitable amplification, can be utilized for synchronization purposes. It would also be conceivable to generate such pulses by tapping the control or drive coil or by coupling a further winding, such as the winding 35 of FIGURE 5, thereto. The frequency constant of the resulting frequency transmitter or generator corresponds to that of a simple quartz circuit and can be made superior thereto in accuracy. Since the technological and manufacturing difficulties are much less than for a quartz circuit, particular advantages result when the motor according to the present invention is used as a frequency transmitter or generator.

As pertains to the constructive aspects of rotor 6, its construction depends to a certain extent on the drive requirements which it must fulfill and on the oscillating characteristics which the oscillating system must have. A very simple arrangement requiring a very small load mass can be achieved by giving the swing arms a substantially S-shaped form whose center portion connecting the two vibratory ends with each other constitutes the rotor, such an arrangement being shown in FIGURE 4. Of course, the same idea can be applied to an embodiment of the type shown in FIGURE 2 as well as in the case where more than one pair of swing arms are provided.

It will be understood that the above description of the present invention is susceptible to various modifications, changes and adaptations, and the same are intended to be comprehended within the meaning and range of equivalents of the appended claims.

I claim:

1. In an electric motor having a constant rotation rate and including a rotor whose speed is regulated by a mechanical oscillatory system coupled to the rotor, and a triggerable electrical drive system associated with the oscillatory system so as to be triggered in synchronism with the oscillatory system oscillations for producing excitation pulses for driving the rotor, the improvement wherein said oscillatory system comprises at least one resilient oscillatory arm mounted on said rotor to have one free end which is arranged to oscillate and to be periodically influenced by the drive system excitation pulses when said rotor is rotating.

2. An arrangement as defined in claim 1 wherein said electrical drive system comprises at least one control winding, one excitation winding, and one trigger element connected between said control winding and said excitation winding for causing each voltage pulse induced in said control winding to initiate the production of an excitation pulse by said excitation winding, and wherein said arrangement further comprises at least one magnet mounted for rotation relative to said control and excitation windings and arranged so that its associated magnetic field cooperates with said windings.

3. An arrangement as defined in claim 2 wherein said electrical drive system is stationary and said magnet is carried by the free end of said oscillatory arm.

4. An arrangement as defined in claim 3 further comprising a U-shaped bar carried by the free end of said oscillatory arm, and wherein two magnets are provided and are carried on said bar so as to be spaced from one another by an air gap which traverses said windings during rotor rotation.

5. An arrangement as defined in claim 2 wherein the axes of said control and excitation windings are offset with respect to the axis of the magnetic field of said magnet when said oscillatory arm is in its rest position.

6. An arrangement as defined in claim 5 wherein the axes of said control and excitation windings are offset from the axis of the magnetic field of said magnet in a radial direction perpendicular to the axis of rotation of said rotor.

7. An arrangement as defined in claim 2 wherein said windings are mounted to rotate with said rotor, at least one of said windings being carried by the free end of said oscillatory arm, and said magnet is stationary.

8. An arrangement as defined in claim 7 wherein all of said electrical drive system is mounted on said rotor, and said drive system further includes an electrical current source.

9. An arrangement as defined in claim 2 wherein said magnet is mounted on said rotor and is associated with said oscillatory arm so as to cause the flux lines produced by said magnet to emanate from the free end of said oscillatory arm, said arrangement further comprising a magnetic pole piece carried by the free end of said oscillatory arm.

10. An arrangement as defined in claim 2 further comprising an additional winding arranged to be traversed by the magnetic field of said magnet to have a voltage pulse induced in it each time it is so traversed, and an amplifying element connected to amplify each induced pulse to provide a constant frequency synchronizing signal.

11. An arrangement as defined in claim 10 wherein said electrical drive system is electrically connected to a further electrical element to which each amplified pulse is transmitted.

12. An arrangement as defined in claim 1 wherein there are provided at least one pair of oscillatory arms and wherein each said pair of arms is integral with, and forms an S-shaped member with, at least a portion of said rotor.

13. An arrangement as defined in claim 1 wherein there are provided at least two oscillatory arms mounted on said rotor and disposed symmetrically about the rotor axis.

14. An arrangement as defined in claim 1 wherein each said arm is adjustably mounted on said rotor.

15. An arrangement as defined in claim 1 further comprising a load mass carried by the free end of each said oscillatory arm for determining the frequency of the oscillation of said arm.

16. An arrangement as defined in claim 1 wherein each said oscillatory arm is constituted by a thin steel strip.

17. An arrangement as defined in claim 1 wherein said oscillatory arm is arranged to oscillate in a plane perpendicular to the axis of rotation of said rotor.

18. An arrangement as defined in claim 1 wherein said oscillatory arm is arranged to oscillate in a plane substantially parallel to the axis of rotation of said rotor.

19. An arrangement as defined in claim 1 further comprising a starting device operatively associated with the shaft of said rotor.

20. An arrangement as defined in claim 1 wherein the excitation pulses from said drive system are employed as constant frequency synchronizing pulses for maintaining constant the speed of a higher-powered motor.

21. An arrangement as defined in claim 1 wherein said motor is employed to drive a clock mechanism.

22. An arrangement as defined in claim 1 wherein said motor is employed as a constant frequency signal generator.

References Cited

UNITED STATES PATENTS 3,338,048   8/1967   Studer _____ 310—24

ORIS L. RADER, Primary Examiner

G. R. SIMMONS, Assistant Examiner

U.S. Cl. X.R.

318—132, 254, 310

UNITED STATES PATENT OFFICE
CERTIFICATE OF CORRECTION

Patent No. 3,471,762                                   October 7, 1969

Siegfried Urban

It is certified that error appears in the above identified patent and that said Letters Patent are hereby corrected as shown below:

Column 1, line 5, "Near" should read -- Nr. --. Column 2, line 48, "The" should read -- These --; line 71, "aicording" should read -- according --. Column 3, line 23, "comoosed" should read -- composed --.

Signed and sealed this 24th day of February 1970.

(SEAL)
Attest:

Edward M. Fletcher, Jr.                        WILLIAM E. SCHUYLER, JR.
Attesting Officer                                     Commissioner of Patents